US012665656B2

(12) United States Patent
Fan et al.

(10) Patent No.: US 12,665,656 B2
(45) Date of Patent: Jun. 23, 2026

(54) METHOD FOR DETERMINING RECEIVE PARAMETER USED FOR CHANNEL MEASUREMENT AND APPARATUS

(71) Applicant: HUAWEI TECHNOLOGIES CO., LTD., Shenzhen (CN)

(72) Inventors: Bo Fan, Chengdu (CN); Peng Guan, Shenzhen (CN); Xiaobo Yang, Chengdu (CN); Lei Chen, Chengdu (CN); Xi Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1115 days.

(21) Appl. No.: 17/648,080

(22) Filed: Jan. 14, 2022

(65) Prior Publication Data

US 2022/0140887 A1 May 5, 2022

Related U.S. Application Data

(63) Continuation of application No. PCT/CN2020/099271, filed on Jun. 30, 2020.

(30) Foreign Application Priority Data

Jul. 17, 2019 (CN) .......................... 201910644270.9

(51) Int. Cl.
| | |
|---|---|
| *H04B 7/08* | (2006.01) |
| *H04B 7/06* | (2006.01) |
| *H04L 5/00* | (2006.01) |

(52) U.S. Cl.
CPC ........... *H04B 7/088* (2013.01); *H04B 7/0626* (2013.01); *H04L 5/0094* (2013.01)

(58) Field of Classification Search
CPC ..... H04B 7/088; H04B 7/0626; H04L 5/0094; H04L 5/0048; H04L 5/0053; H04W 24/10; H04W 24/02; H04W 24/08
See application file for complete search history.

(56) References Cited

U.S. PATENT DOCUMENTS

| | | | | | |
|---|---|---|---|---|---|
| 2018/0359747 | A1* | 12/2018 | Yang | ...................... | H04W 72/04 |
| 2019/0373486 | A1* | 12/2019 | Bai | ........................ | H04L 1/0009 |

(Continued)

FOREIGN PATENT DOCUMENTS

| | | |
|---|---|---|
| CN | 108521878 A | 9/2018 |
| CN | 109802787 A | 5/2019 |

(Continued)

OTHER PUBLICATIONS

3GPP TSG RAN WG1 Meeting #94,R1-1808221,Remaining issues on beam measurement and reporting,vivo, Gothenburg, Sweden, Aug. 20, 24, 2018,total 7 pages.

(Continued)

*Primary Examiner* — Fred A Casca
(74) *Attorney, Agent, or Firm* — WOMBLE BOND DICKINSON (US) LLP

(57) ABSTRACT

This application provides a method for determining a receive parameter used for channel measurement, including: receiving measurement configuration information, where the measurement configuration information includes configuration information of at least one resource; and if any one or more of the following conditions are met, determining that the at least one resource and n resources have a same receive beam, where the n resources are n resources that can be simultaneously received, and n≥2; the condition includes: the at least one resource has a same transmission configuration index (TCI) configuration as one of the n resources; the at least one resource has a same TCI configuration as one of the n resources, and a parameter groupBasedBeamReporting is further configured in the measurement configuration information; or the at least one resource has a same TCI configuration as one of the n resources, and a value of a configured parameter groupBasedBeamReporting is enabled.

12 Claims, 6 Drawing Sheets

(56) References Cited

U.S. PATENT DOCUMENTS

| | | | | |
|---|---|---|---|---|
| 2022/0038194 | A1* | 2/2022 | Matsumura | H04L 5/005 |
| 2022/0286175 | A1* | 9/2022 | Matsumura | H04B 7/0695 |

FOREIGN PATENT DOCUMENTS

| | | | |
|---|---|---|---|
| CN | 109802818 A | 5/2019 | |
| CN | 109803427 A | 5/2019 | |
| CN | 109963346 A | 7/2019 | |
| WO | 2016015579 A1 | 2/2016 | |
| WO | 2019168762 A1 | 9/2019 | |

OTHER PUBLICATIONS

3GPP TS 38.211 V15.5.0 (Mar. 2019),3rd Generation Partnership Project;Technical Specification Group Radio Access Network;NR;Physical channels and modulation(Release 15),total 96 pages.

3GPP TS 38.212 V15.5.0 (Mar. 2019),3rd Generation Partnership Project;Technical Specification Group Radio Access Network;NR;Multiplexing and channel coding(Release 15),total 101 pages.total 101 pages.

3GPP TS 38.213 V15.5.0 (Mar. 2019),3rd Generation Partnership Project;Technical Specification Group Radio Access Network;NR;Physical layer procedures for control(Release 15),total 104 pages.

3GPP TS 38.214 V15.5.0 (Mar. 2019),3rd Generation Partnership Project;Technical Specification Group Radio Access Network;NR;Physical layer procedures for data(Release 15),total 103 pages.

3GPP TS 38.331 V15.5.0 (Mar. 2019),3rd Generation Partnership Project;Technical Specification Group Radio Access Network; NR;Radio Resource Control (RRC) protocol specification(Release 15),total 491 pages.

Anonymous: "3rd Generation Partnership Project; Technical Specification Group Radio Access Network; NR; Physical layer procedures for data (Release 15)", 3GPP Standard; Technical Specification; 3GPP TS 38.214,V15.6.0, Jun. 24, 2019 (Jun. 24, 2019), pp. 1-105.

ZTE et al: "Discussion on physical-layer procedure for NR positioning", 3GPP Draft; R1-1906427,May 13, 2019,total 5 pages.

* cited by examiner

METHOD FOR DETERMINING RECEIVE PARAMETER USED FOR CHANNEL MEASUREMENT AND APPARATUS

CROSS-REFERENCE TO RELATED APPLICATIONS

This application is a continuation of International Application No. PCT/CN2020/099271, filed on Jun. 30, 2020, which claims priority to Chinese Patent Application No. 201910644270.9, filed on Jul. 17, 2019. The disclosures of the aforementioned applications are hereby incorporated by reference in their entireties.

TECHNICAL FIELD

This application relates to the communications field, and more particularly, to a method for determining a receive parameter used for channel measurement and an apparatus.

BACKGROUND

A fifth generation (5G) mobile communications system uses high-frequency communication, that is, uses an ultra-high frequency band (>6 GHz) signal to transmit data. A main problem of the high-frequency communication is that energy of a signal sharply decreases as a transmission distance increases, resulting in a short transmission distance of the signal. To overcome this problem, the high-frequency communication adopts an analog beam technology, in which a large-scale antenna array is used for weighted processing, so that signal energy is concentrated in a relatively small range, to form a signal similar to an optical beam (the signal is referred to as an analog beam, a beam for short), thereby extending a transmission distance. Both a network device and a terminal device may generate different beams, and send or receive signals in different directions. A transmit beam used by the network device to send data and a receive beam used by the terminal device to receive data are determined through beam measurement. Through beam measurement, the terminal device may determine a transmit beam that is most appropriate for the network device to send data to the terminal device, and a receive beam that is most appropriate for the terminal device to receive the transmit beam. After determining the beam information, the terminal device reports an index of the transmit beam to the network device. In this way, the network device sends data to the terminal device by using the beam. When sending data to the terminal device, the network device may indicate, to the terminal device by using downlink control information (DCI), information about a transmit beam used by the network device. In this way, the terminal device learns of a receive beam that should be used for receiving, thereby implementing communication based on the analog beam.

Due to relatively narrow coverage of a beam, transmission of a large quantity of streams (which is also referred to as high-rank transmission, for example, 4-stream transmission, that is, rank-4 transmission) cannot be implemented by using a single beam. To perform high-rank transmission, a plurality of beams need to be used. For example, as shown in FIG. 1, the network device simultaneously transmits data to the terminal device by using two beams, and each beam is used to transmit two streams of data, thereby implementing rank-4 transmission. To implement high-rank transmission based on two beams, in a beam measurement process, the terminal device needs to report, to the network device, information about two beams that can be simultaneously received by the terminal device. During measurement configuration, the network device may configure a parameter groupBasedBeamReporting to be enabled, to indicate the terminal device to report information about a plurality of beams that can be simultaneously received by the terminal device. In this way, the terminal device reports, to the network device, two beams that can be simultaneously received.

Before data transmission, the terminal device needs to perform corresponding channel measurement, and report channel state information (CSI) of a channel to the network device. The CSI information includes one or more of a channel quality indicator (CQI), a rank indicator (RI), a precoding matrix indicator (PMI), a layer indicator (LI), and the like. The channel measurement is implemented by measuring a resource. The terminal device measures a resource corresponding to a transmit beam of the network device to determine CSI of the transmit beam. When performing channel measurement, the network device indicates, to the terminal device, information about a transmit beam corresponding to a resource that needs to be measured, that is, indicates CSI of the transmit beam that is obtained through measurement of the resource. In this way, the terminal device learns of a corresponding receive beam for measurement.

In high-rank transmission based on a plurality of beams, the network device sends data to the terminal device by using a plurality of (two or more) transmit beams. Therefore, the terminal device needs to obtain through measurement CSI of a channel including the plurality of beams. However, in the conventional technology, channel measurement is performed for a single beam, and a receive parameter used for performing channel measurement for a plurality of beams cannot be determined. Consequently, it is difficult to implement joint channel measurement for a plurality of beams.

SUMMARY

This application provides a method for determining a receive parameter used for channel measurement and an apparatus, to facilitate determining a receive parameter used for performing channel measurement for a plurality of beams.

According to an aspect, a method for determining a receive parameter used for channel measurement is disclosed. The method includes:

receiving measurement configuration information, where the measurement configuration information includes configuration information of at least one resource; and if any one or more of the following conditions are met, determining that the at least one resource and n resources have a same receive beam, where the n resources are n resources that can be simultaneously received, and n≥2; and the condition includes:

the at least one resource has a same transmission configuration index (TCI) configuration as one of the n resources;

the at least one resource has a same TCI configuration as one of the n resources, and a parameter groupBasedBeamReporting is further configured in the measurement configuration information;

the at least one resource has a same TCI configuration as one of the n resources, and a value of a configured parameter groupBasedBeamReporting is enabled or disabled;

a parameter groupBasedBeamReporting is configured in the measurement configuration information; or a quantity of antenna ports of the at least one resource configuration exceeds a preset threshold.

The at least one resource is associated with a reporting configuration (reportConfig) corresponding to n downlink signal resources that can be simultaneously received.

With reference to the foregoing solution, the method further includes: simultaneously receiving the at least one resource by using receive beams corresponding to the n resources for measurement.

With reference to the foregoing solution, the n resources are n recently reported resources that can be simultaneously received.

With reference to the foregoing solution, before the operations, the method further includes: reporting information about the n resources to a network device.

With reference to the foregoing solution, the simultaneously receiving the at least one resource by using receive beams corresponding to the n resources for measurement is: simultaneously receiving, by using the receive beams corresponding to the n resources, a measurement signal corresponding to the at least one resource, and performing channel measurement.

The measurement signal corresponding to the at least one resource is sent by the network device, may be simultaneously sent, or may be sequentially sent.

The foregoing uses one resource as an example for description. If there are a plurality of resources, the foregoing process is applicable to each resource.

According to another aspect, a method for determining a receive parameter used for channel measurement is disclosed. The method includes:

receiving measurement configuration information, where the measurement configuration information includes configuration information of m resources; and if any one or more of the following conditions are met, determining that the m resources and n resources have a same receive beam, where the n resources are n resources that can be simultaneously received, $m \geq 2$, and $n \geq m$; and the condition includes:

the m resources and m resources in the n resources respectively have same TCI configurations;

the m resources and m resources in the n resources respectively have same TCI configurations, and a value of a parameter groupBasedBeamReporting in the measurement configuration information is enabled or disabled;

configurations of the m resources are in a same resource set; and configurations of the m resources are on a same orthogonal frequency division multiplexing (OFDM) symbol; or a value of a parameter groupBasedBeamReporting is enabled or disabled.

With reference to the foregoing solution, the method further includes: simultaneously receiving, by using receive beams corresponding to the n resources, the m resources for measurement.

With reference to the foregoing solution, the n resources are n recently reported resources that can be simultaneously received.

With reference to the foregoing solution, before the operations, the method further includes: reporting information about the n resources to a network device.

With reference to the foregoing solution, the simultaneously receiving, by using receive beams corresponding to the n resources, the m resources for measurement is: simultaneously receiving, by using the receive beams corresponding to the n resources, measurement signals corresponding to the m resources, and performing channel measurement.

With reference to the foregoing solutions, the method further includes: reporting a measurement result to the network device.

The n resources are n recently reported resources that can be simultaneously received.

With reference to the foregoing solutions, the n resources may be non-zero-power channel state information reference signal (NZP CSI-RS) resources, synchronization signal and physical broadcast channel block (SSB) resources, channel state information-interference measurement (CSI-IM) resources, zero-power channel state information reference signal (ZP CSI-RS) resources, or any other downlink signal resource.

The foregoing solutions may be performed by a terminal device, or may be performed by a chip or a corresponding functional module in the terminal device.

According to a still another aspect, a communications apparatus is provided. The apparatus may be a terminal device, or may be a chip in the terminal device. The apparatus has a function of implementing the various aspects and various possible embodiments thereof. The function may be implemented by hardware, or may be implemented by hardware executing corresponding software. The hardware or the software includes one or more modules corresponding to the function.

In one embodiment, the apparatus includes a transceiver module and a processing module. The transceiver module may be, for example, at least one of a transceiver, a receiver, or a transmitter. The transceiver module may include a radio frequency circuit or an antenna. The processing module may be a processor. In one embodiment, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, so that the apparatus performs the communication method according to the first aspect and various possible embodiments thereof. In this embodiment, the apparatus may be the terminal device.

In one embodiment, when the apparatus is the chip, the chip includes a transceiver module and a processing module. The transceiver module may be, for example, an input/output interface, a pin, or a circuit on the chip. The processing module may be, for example, a processor. The processing module may execute instructions, so that the communication method in the first aspect or any possible embodiment is performed. In one embodiment, the processing module may execute instructions in a storage module, and the storage module may be a storage module in the chip, for example, a register or a buffer. The storage module may alternatively be located inside a communications device but outside the chip, for example, a read-only memory (ROM) or another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the communication methods according to the foregoing aspects.

In one embodiment, when the apparatus is the chip, the chip includes a transceiver module and a processing module. The transceiver module may be, for example, an input/output interface, a pin, or a circuit on the chip. The processing module may be, for example, a processor. The processing module may execute instructions, so that the chip in the terminal performs the methods according to the foregoing aspects.

In one embodiment, the processing module may execute instructions in a storage module, and the storage module may be a storage module in the chip, for example, a register or a buffer. The storage module may alternatively be located inside a communications device but outside the chip, for example, a ROM or another type of static storage device that can store static information and instructions, or a RAM.

The processor mentioned above may be a CPU, a microprocessor, an application-specific integrated circuit (ASIC), or one or more integrated circuits configured to control program execution of the communication methods according to the foregoing aspects.

This application further discloses a chip, including a processor and an interface. The processor is configured to: invoke, from a memory by using the interface, a computer program stored in the memory, and run the computer program stored in the memory, to perform the methods according to the foregoing aspects.

This application further discloses a chip, including a processor and an interface. The interface is configured to receive measurement configuration information, where the measurement configuration information includes configuration information of at least one resource.

The processor is configured to perform a determining operation in any one of the methods according to the foregoing aspects.

This application further discloses a communications apparatus, including a processor. The processor is configured to be coupled to a memory, the memory is configured to store a program or instructions, and when the program or the instructions are executed by the processor, the apparatus is enabled to perform the methods according to the foregoing aspects.

This application further discloses a computer-readable storage medium, configured to store a computer program. When the computer program is run by a computer, the computer is enabled to perform the methods according to the foregoing aspects.

This application further discloses a computer program product including instructions. When the computer program product runs on a computer, the computer is enabled to perform the methods according to the foregoing aspects or any possible embodiment thereof.

Based on the foregoing technical solutions, a receive parameter used for performing channel measurement may be determined for a plurality of beams, thereby implementing multi-beam based channel measurement. Further, the multi-beam channel measurement may support multi-beam transmission, thereby improving throughput performance of data transmission.

DESCRIPTION OF EMBODIMENTS

Figure 1:
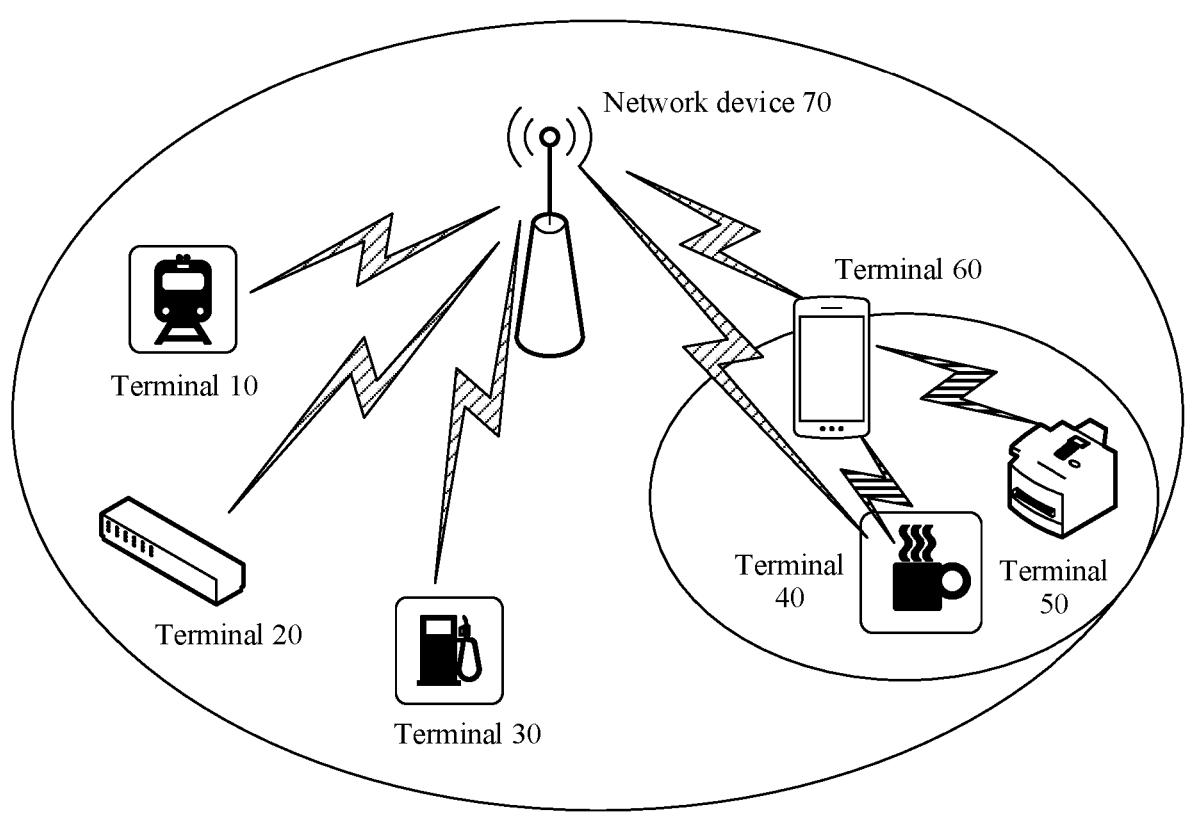
FIG. 1 is a schematic diagram of a communications system according to this application.

The following describes the technical solutions in this application with reference to the accompanying drawings.

The following describes terms used in this application.

1. Beam (Beam):

The beam is a communication resource, and different beams may be considered as different communication resources. The different beams may be used to send same information, or may be used to send different information. The beam may correspond to at least one of a time domain resource, a space resource, and a frequency domain resource.

In one embodiment, a plurality of beams having a same or similar communication feature may be considered as one beam, and one beam corresponds to one or more antenna ports, and is used to transmit a data channel, a control channel, a sounding signal, and the like. For example, a transmit beam may refer to signal strength distribution formed in different directions in space after a signal is transmitted through an antenna, and a receive beam may refer to signal strength distribution of a radio signal received from an antenna in different directions in space.

In one embodiment, the beam may be a wide beam, may be a narrow beam, or may be a beam of another type. A technology for forming a beam may be a beamforming technology or another technical means. This is not limited in this application. With the use of the beamforming technology, a higher antenna array gain may be obtained by sending or receiving a signal in a particular direction in space. In addition, beams may be classified into a transmit beam and a receive beam of a network device and a transmit beam and a receive beam of a terminal. The transmit beam of the network device is used to describe receive-side beamforming information of the network device, and the receive beam of the network device is used to describe receive-side beamforming information of the network device. The transmit beam of the terminal is used to describe transmit-side beamforming information of the terminal, and the receive beam of the terminal is used to describe receive-side beamforming information.

In one embodiment, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change in a direction of an analog beam. Therefore, one RF chain can generate only one analog beam at a same moment. In addition, for communication based on the analog beam, a beam at a transmit end and a beam at a receive end need to be aligned. Otherwise, a signal cannot be normally transmitted.

It should be understood that one or more antenna ports corresponding to one beam may also be considered as one antenna port set.

It should be further understood that the beam may be further represented by using a spatial filter or a spatial transmission filter (spatial domain transmission filter). In other words, the beam may also be referred to as the "spatial filter". A transmit beam is referred to as a "spatial transmit filter", and a receive beam is referred to as a "spatial receive filter" or a "downlink spatial filter". The receive beam of the network device or the transmit beam of the terminal may also be referred to as an "uplink spatial filter", and the transmit beam of the network device or the receive beam of the terminal may also be referred to as a "downlink spatial filter". N optimal beam pairs (beam pair links, BPLs) (where one BPL includes one transmit beam of the network device and one receive beam of the terminal, or one BPL includes one transmit beam of the terminal and one receive beam of the network device) are selected, so that the terminal selects the transmit beam of the network device and/or the receive beam of the terminal based on beam sweeping performed by the network device, and the network device selects the transmit beam of the terminal and/or the receive beam of the network device based on beam sweeping performed by the terminal.

In one embodiment, the transmit beam may be a base station transmit beam or a terminal transmit beam. When the transmit beam is the base station transmit beam, a base station sends reference signals to user equipment (UE) by using different transmit beams, and the UE receives, by using a same receive beam, the reference signals sent by the base station by using the different transmit beams, determines an optimal base station transmit beam based on the received signals, and then feeds back the optimal base station transmit beam to the base station, so that the base station updates the transmit beam When the transmit beam is the terminal transmit beam, the UE sends reference signals to the base station by using different transmit beams, and the base station receives, by using a same receive beam, the reference signals sent by the UE by using the different transmit beams, determines an optimal UE transmit beam based on the received signals, and then feeds back the optimal UE transmit beam to the UE, so that the UE updates the transmit beam. The process of sending reference signals by using different transmit beams may be referred to as beam sweeping, and the process of determining an optimal transmit beam based on the received signals may be referred to as beam matching.

The receive beam may be a base station receive beam or a terminal receive beam. When the receive beam is the base station receive beam, the UE sends reference signals to the base station by using a same transmit beam, and the base station receives, by using different receive beams, the reference signals sent by the UE, and then determines an optimal base station receive beam based on the received signals, to update the base station receive beam. When the receive beam is the UE receive beam, the base station sends reference signals to the UE by using a same transmit beam, and the UE receives, by using different receive beams, the reference signals sent by the base station, and then determines an optimal UE receive beam based on the received signals, to update the UE receive beam.

It should be noted that for downlink beam training, the network device configures a type of a reference signal resource set for beam training. When a repetition parameter configured for the reference signal resource set is "on", the terminal assumes that reference signals in the reference signal resource set are transmitted by using a same downlink spatial filter, that is, are transmitted by using a same transmit beam. In this case, usually, the terminal receives the reference signals in the reference signal resource set by using different receive beams, and obtains a best receive beam of the terminal through training. In one embodiment, the terminal may report best channel quality that is of N reference signals and that is measured by the UE. When the repetition parameter configured for the reference signal resource set is "off", the terminal does not assume that the reference signals in the reference signal resource set are transmitted by using the same downlink spatial filter, that is, does not assume that the network device transmits the reference signals by using the same transmit beam. In this case, the terminal selects N best beams from the resource set by measuring channel quality of the reference signals in the set, and feeds back the N best beams to the network device. Usually, in this case, the terminal uses a same receive beam in this process.

2. Beamforming Technology (Beamforming):

With the use of the beamforming technology, a higher antenna array gain may be obtained by sending or receiving a signal in a particular direction in space. Analog beamforming may be implemented by using a radio frequency. For example, a phase of a radio frequency chain (RF chain) is adjusted by using a phase shifter, to control a change in a direction of an analog beam. Therefore, one RF chain can generate only one analog beam at a same moment.

3. Beam Management Resource:

The beam management resource is a resource used for beam management, and may also be represented as a resource used to calculate and measure beam quality. The beam quality includes layer 1 reference signal received power (L1-RSRP), layer 1 reference signal received quality (L1-RSRQ), and the like. In one embodiment, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

4. Resource

During beam measurement, a beam corresponding to a resource may be uniquely identified by using an index of the resource. The resource may be an uplink signal resource, or may be a downlink signal resource. An uplink signal includes but is not limited to a sounding reference signal (SRS) and a demodulation reference signal (DMRS). A downlink signal includes but is not limited to a channel state information reference signal (CSI-RS), a cell-specific reference signal (CS-RS), a UE specific reference signal (US-RS), a demodulation reference signal (DMRS), and a synchronization signal/physical broadcast channel block (SS/PBCH block). The SS/PBCH block may be referred to as a synchronization signal block (SSB) for short.

The resource is configured by using radio resource control (RRC) signaling. In a configuration structure, one resource is one data structure, including a related parameter of an uplink/downlink signal corresponding to the resource, for example, a type of the uplink/downlink signal, a resource element for carrying the uplink/downlink signal, time and a periodicity of sending the uplink/downlink signal, and a quantity of ports used to send the uplink/downlink signal. Each resource of the uplink/downlink signal has a unique index, to identify the resource of the uplink/downlink signal. It may be understood that the index of the resource may also be referred to as an identifier of the resource. This is not limited in the embodiments of this application.

5. Beam Indication Information:

The beam indication information is used to indicate a beam used for transmission, including a transmit beam and/or a receive beam. The beam indication information includes at least one of a beam number, a beam management resource number, an uplink signal resource number, a downlink signal resource number, an absolute index of the beam, a relative index of the beam, a logical index of the beam, an index of an antenna port corresponding to the beam, an index of an antenna port group corresponding to the beam, an index of a downlink signal corresponding to the beam, a time index of a downlink synchronization signal block corresponding to the beam, beam pair link (BPL) information, a transmit parameter (Tx parameter) corresponding to the beam, a receive parameter (Rx parameter) corresponding to the beam, a transmit weight corresponding to the beam, a weight matrix corresponding to the beam, a weight vector corresponding to the beam, a receive weight corresponding to the beam, an index of the transmit weight corresponding to the beam, an index of the weight matrix corresponding to the beam, an index of the weight vector corresponding to the beam, an index of the receive weight corresponding to the beam, a receive codebook corresponding to the beam, a transmit codebook corresponding to the beam, an index of the receive codebook corresponding to the beam, and an index of the transmit codebook corresponding to the beam. A downlink signal includes any one of a synchronization signal, a broadcast channel, a broadcast signal demodulation signal, a channel state information downlink signal (CSI-RS), a cell-specific reference signal (CS-RS), a terminal-specific reference signal (US-RS), a downlink control channel demodulation reference signal, a downlink data channel demodulation reference signal, or a downlink phase noise tracking signal. An uplink signal includes any one of an uplink random access sequence, an uplink sounding reference signal, an uplink control channel demodulation reference signal, an uplink data channel demodulation reference signal, or an uplink phase noise tracking signal. In one embodiment, the network device may further allocate a QCL identifier to beams having a quasi-co-location (QCL) relationship in beams associated with a frequency resource group. The beam may also be referred to as a spatial transmission filter, the transmit beam may also be referred to as a spatial transmit filter, and the receive beam may also be referred to as a spatial receive filter. The beam indication information may be further represented as a transmission configuration index (TCI). The TCI may include a plurality of parameters such as a cell number, a bandwidth part number, a reference signal identifier, a synchronization signal block identifier, and a QCL type. A quasi-co-location (QCL) relationship is used to indicate that a plurality of resources have one or more same or similar communication features. A same or similar communication configuration may be used for the plurality of resources having the co-location relationship. For example, if two antenna ports have a co-location relationship, a large-scale channel property in which one port transmits a symbol may be inferred from a large-scale channel property in which the other port transmits a symbol. The large-scale property may include a delay spread, an average delay, a Doppler spread, a Doppler shift, an average gain, a receive parameter, a receive beam number of the terminal, a transmit/receive channel correlation, an angle of arrival for reception, a spatial correlation of a receiver antenna, a dominant angle of arrival (AoA), an average angle of arrival, an AoA spread, and the like. Spatial quasi-co-location (spatial QCL) may be considered as a type of QCL. The term "spatial" may be understood from two perspectives: a transmit end or a receive end. From the perspective of the transmit end, if two antenna ports are spatially quasi-co-located, it means that beam directions corresponding to the two antenna ports are the same in space. From the perspective of the receive end, if two antenna ports are spatially quasi-co-located, it means that the receive end can receive, in a same beam direction, signals sent by the two antenna ports.

6. QCL:

The co-location relationship is used to indicate that a plurality of resources have one or more same or similar communication features. A same or similar communication configuration may be used for the plurality of resources having the co-location relationship. For example, if two antenna ports have a co-location relationship, a large-scale channel property in which one port transmits a symbol may be inferred from a large-scale channel property in which the other port transmits a symbol. The large-scale property may include a delay spread, an average delay, a Doppler spread, a Doppler shift, an average gain, a receive parameter, a receive beam number of the terminal, a transmit/receive channel correlation, an angle of arrival for reception, a spatial correlation of a receiver antenna, a dominant angle of arrival (AoA), an average angle of arrival, an AoA spread, and the like.

7. Beam Management

Beam management is a beam measurement process in Release 15, and may be classified into downlink beam management and uplink beam management.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future fifth generation (5G) system, or a new radio (NR) system.

The terminal in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile communications network (PLMN), or the like. This is not limited in the embodiments of this application.

The network device in the embodiments of this application may be a device configured to communicate with the terminal. The network device may be a base transceiver station (BTS) in a global system for mobile communications (GSM) or code division multiple access (CDMA), may be a NodeB (NodeB, NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or one or a group of antenna panels (including a plurality of antenna panels) of a base station in a 5G system, or may be a network node that constitutes a gNB or a transmission point, for example, a baseband unit (BBU) or a distributed unit (DU). This is not limited in the embodiments of this application.

In some deployments, a gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

In the embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a structure of an execution body of a method provided in the embodiments of this application is not limited in the embodiments of this application, provided that a program that records code of the method provided in the embodiments of this application can be run to perform communication according to the method provided in the embodiments of this application. For example, the execution body of the method provided in the embodiments of this application may be the terminal or the network device, or may be a functional module that can invoke the program and execute the program in the terminal or the network device.

In addition, aspects or features of this application may be implemented as a method, an apparatus or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communications system. The terminal 60 may send downlink signals to the terminal 40 and the terminal 50, or may receive uplink signals sent by the terminal 40 and the terminal 50.

It should be noted that the embodiments of this application may be applied to a communications system including one or more network devices, or may be applied to a communications system including one or more terminals. This is not limited in this application.

It should be understood that the communications system may include one or more network devices. One network device may send data or control signaling to one or more terminals. A plurality of network devices may simultaneously send data or control signaling to one or more terminals.

In a protocol, a beam is usually represented by using a resource, that is, a resource usually has a one-to-one correspondence with a beam. For example, the network device configures measurement resources, and the terminal device determines CSI of the beam by measuring the resources. When the network device transmits data, information about a transmit beam is also indicated by using a resource. A resource is usually equivalent to a beam. When all antenna ports of a resource use a same beam to send a signal, one resource corresponds to one beam; otherwise, one resource may correspond to a plurality of beams. Therefore, the resource and the beam may be replaced with each other based on the foregoing relationship.

In this application, a beam may be replaced with a resource, or a resource may be replaced with a beam.

During measurement configuration, the network device needs to indicate information about a plurality of transmit beams to the terminal device, so that the terminal device can receive and measure the plurality of transmit beams by using corresponding receive beams.

Figure 2:
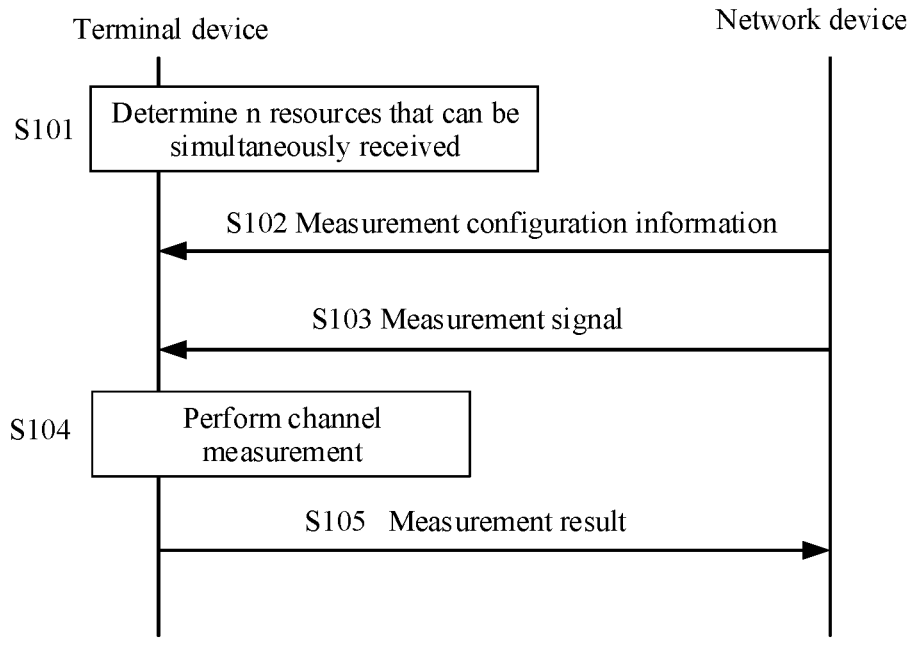
FIG. 2 is a schematic flowchart of a channel measurement method according to an embodiment of this application.

This application discloses a beam measurement method. As shown in FIG. 2, the method includes the following operations.

S101. A terminal device determines n (n≥2) resources that can be simultaneously received.

During beam management, a network device configures a parameter groupBasedBeamReporting to enabled in delivered measurement configuration information. In this way, the terminal device determines, through measurement, the n resources that can be simultaneously received by the terminal device, and may further report information about (for example, indexes of) the n resources to the network device.

For ease of description, in this embodiment, two resources (that is, n is equal to 2) are used as an example for description, and solutions in other cases (n is greater than 2) may be derived by analogy. Therefore, it should be understood that the case in which n is greater than 2 also falls within the protection scope of the present application. It is assumed that the two resources that can be simultaneously received by the terminal device and that are reported by the terminal device in this operation are a resource #1 and a resource #2.

Alternatively, the terminal device may determine the n resources in another manner. For example, the n resources are configured by the network device or determined by the terminal device. For example, the terminal device uses n resources having a same receive beam as then resources. Examples are not provided herein one by one. Types of the resource #1 and the resource #2 may be non-zero-power channel state information reference signal (NZP CSI-RS) resources, synchronization signal and physical broadcast channel block (SSB) resources, channel state information-interference measurement (CSI-IM) resources, zero-power channel state information reference signal (ZP CSI-RS) resources, or any other downlink signal resource.

In another embodiment, the terminal device may also report n uplink signal resources that can be simultaneously received by the terminal device.

S102. The network device sends the measurement configuration information to the terminal device, where the measurement configuration information includes a configuration of at least one resource.

The following uses a configuration of one resource (a resource #3) as an example for description. A case of a plurality of resources is similar to a case of one resource, and an operation for one resource needs to be performed separately. The resource herein is used by the terminal device to perform measurement, and may be referred to as a measurement resource.

The measurement configuration information mainly includes a measurement resource configuration and a measurement reporting configuration.

The measurement resource configuration includes a configuration of one resource (for example, the resource #3), and the resource may be an NZP CSI-RS resource, an SSB resource, a CSI-IM resource, a ZP CSI-RS resource, or any other downlink signal resource or uplink signal resource.

The configuration of the resource #3 may include a plurality of antenna ports.

A TCI-state of the resource #3 is configured, so that the resource #3 has a same TCI configuration as one of the resource #1 and the resource #2. For example, a reference signal resource corresponding to QCL-info of type D in the TCI-state of the resource #3 is configured as the resource #1 or the resource #2, which indicates that the resource #3 has a same receive beam as the resource #1 or the resource #2.

Having the same TCI configuration may mean that TCI-state indexes are the same; or TCI-state indexes are different but reference signal resources corresponding to the QCL-info of type D included in the TCI-state indexes are the same; or TCI-state indexes are different but reference signal resources corresponding to all QCL-info included in the TCI-state are the same; or there is a mutual inclusion relationship in the TCI-state. For example, the resource included in the TCI-state of the resource #3 is the resource #1, and it may also be considered that the resource #3 and the resource #1 have a same TCI configuration. There may also be other cases, which are not enumerated herein one by one.

The measurement reporting configuration includes configuration information related to measurement result reporting, and includes the parameter groupBasedBeamReporting used to indicate whether the terminal device can report two resources or beams that can be simultaneously received by the terminal device.

S103. The network device sends a corresponding measurement signal to the terminal device based on the measurement configuration information.

In one embodiment, the network device sends a corresponding measurement signal to the terminal device based on the configuration of the resource #3. In one embodiment, the network device separately sends the measurement signal corresponding to the resource #3 to the terminal device by using two beams corresponding to the resource #1 and the resource #2. For example, measurement signals corresponding to the antenna ports of the resource #3 are separately sent to the terminal device. The measurement signals may be sent simultaneously or may be sent sequentially.

The measurement signal may be any downlink signal such as an NZP CSI-RS or an SSB.

S104. The terminal device receives the at least one resource by using receive beams corresponding to the n resources for measurement. The following uses two resources (the resource #1 and the resource #2) as an example for description.

Before performing channel measurement, the terminal device first needs to determine a receive beam used to receive a measurement signal.

For example, the terminal device may determine, by using a TCI-state configuration of the resource #3, a groupBasedBeamReporting configuration, and/or the like, a receive beam to be used to receive the measurement signal. In one embodiment, when some conditions are met, the terminal device may consider that the resource #3 is sent by using two transmit beams corresponding to the resource #1 and the resource #2, or may consider that the resource #3 has a same receive beam as the resource #1 and the resource #2. Therefore, the terminal device needs to measure channel state information CSI of the resource #3 by simultaneously using a receive beam of the resource #1 and a receive beam of the resource #2. For example, when the receive beams corresponding to the resource #1 and the resource #2 are different, the terminal device needs to simultaneously receive, by using the two receive beams, the measurement signal corresponding to the resource #3, to measure the resource #3. The foregoing condition may be any one or more of the following:

The resource #3 has a same TCI configuration as the resource #1 or the resource #2, and the groupBasedBeam-Reporting parameter is configured (regardless of a value);

the resource #3 has a same TCI configuration as the resource #1 or the resource #2, and a value of groupBasedBeamReporting is enabled;

the resource #3 has a same TCI configuration as the resource #1 or the resource #2, and a value of groupBasedBeamReporting is disabled;

the resource #3 has a same TCI configuration as the resource #1 or the resource #2;

the groupBasedBeamReporting parameter is configured (regardless of a value);

a value of groupBasedBeamReporting is enabled;

a value of groupBasedBeamReporting is disabled; or a quantity of antenna ports configured for the resource 3 exceeds a preset threshold, for example, the threshold is 2.

The resource 3 is associated with reporting configurations (reportConfig) corresponding to a plurality of downlink signal resources that can be simultaneously received by the terminal device and that are recently reported by the terminal device.

The parameter groupBasedBeamReporting is configured based on the measurement configuration information.

If any one or more of the foregoing conditions are met, the terminal device simultaneously receives the resource #3 by using the receive beams corresponding to the resource #1 and the resource #2, performs channel measurement, and determines a measurement result. In one embodiment, the terminal device simultaneously receives the measurement signal corresponding to the resource #3, and performs channel measurement. The measurement result may be an RI, a CQI, a PMI, or the like.

The foregoing uses one resource #3 as an example for description. If measurement signals corresponding to a plurality of resources are simultaneously sent by the network device, or may not be simultaneously sent. However, the terminal device simultaneously receives the measurement signals by using receive beams corresponding to the resource #1 and the resource #2, and performs channel measurement.

S105. The terminal device reports the measurement result to the network device.

In addition to the embodiment mentioned in S104, in another embodiment, one parameter may be used to indicate whether the network device performs simultaneous transmission by using a plurality of beams. When the parameter is configured to a particular value, it indicates that the network device performs simultaneously transmission by using the plurality of beams. In this case, although the network device configures only one TCI-state, the terminal device may consider that the network device performs sending by using a group of TCI-states corresponding to the configured TCI-state. Alternatively, when the parameter is configured to a particular value, although the network device configures only one reference signal resource in QCL-info of the TCI-state, the terminal device may consider that the network device actually performs sending by using a group of resources corresponding to the configured resource. For example, when the parameter is configured to a particular value, although the network device configures only one reference signal resource (for example, the resource #1) in the QCL-info of type D included in the TCI-state of the resource #3, the terminal device may consider that the network device performs sending by using a group of resources (for example, the resource #1 and the resource #2). The group of TCI-states or the group of resources used above may be indicated by using signaling (for example, RRC, a MAC CE, or DCI), or may be automatically grouped according to a rule by the terminal device. For example, after reporting the two resources that can be simultaneously received by the terminal device, the terminal device considers the two resources as a group.

In another embodiment, a reference signal RS in QCL-info of another type included in the TCI may also be used for receive beam indication. Two pieces of QCL-info may be configured in the TCI state. A maximum of one piece of QCL-info (for example, the QCL-info of type D) used to indicate information about the receive beam may be configured. In addition, one piece of QCL-info of another type (for example, QCL-info of type D) may be configured to indicate other information. When channels corresponding to the two beams are measured, the QCL-info of the another type may be used as the QCL-info of type D to indicate the information about the receive beam. For example, two pieces of QCL-info are configured in the TCI. Types of the QCL-info are type A and type D. The terminal device may use the QCL-info of type A as the QCL-info of type D, that is, determine the information about the receive beam by using a reference signal resource in the QCL-info of type A. In one embodiment, the network device may indicate, by using indication information, the terminal device to determine the information about the receive beam by using the foregoing method. That is, the network device sends the indication information to the terminal device, and indicates the terminal device to determine the information about the receive beam by using a reference signal resource in the QCL-info of the another type (which generally refers to QCL-info that is not used to indicate the information about the receive beam). The indication information may be indicated by using a dedicated parameter, or may be indicated by using a combination of a plurality of parameters.

In another embodiment, a quantity of TCI-states that can be configured for each resource may be increased to K (K>1), a quantity of QCL-info of type D in the TCI-state may be increased to K (K>1), or a quantity of reference signal resources in the QCL-info of type D is increased to K (K>1). In this way, a plurality of reference signal resources may be configured for each measurement resource, to indicate information about receive beams of a plurality of transmit beams.

In another embodiment, TCI-states may be grouped, and an index of a TCI-state group is configured during resource configuration. In this way, a plurality of reference signal resources may be configured for each measurement resource, to indicate information about receive beams of a plurality of transmit beams.

In another embodiment, the foregoing method may also be applied to uplink multi-beam measurement. For example, the network device may configure a sounding reference signal (SRS) resource for the terminal device. When a condition is met, the terminal device sends the SRS resource by using receive beams corresponding to a plurality of downlink signal resources that can be simultaneously received by the terminal device and that are recently reported by the terminal device. The condition may be one or a combination of the following:

The SRS includes one spatialRelation or UL TCI field, and the spatialRelation or UL TCI field includes only one reference resource. The reference signal is one of a plurality of downlink signal resources that can be simultaneously received by the terminal device and that are recently reported by the terminal device.

The SRS includes one spatialRelation or UL TCI field, and each spatialRelation or UL TCI field includes a plurality of reference resources. The plurality of reference resources have a one-to-one correspondence with a plurality of downlink signal resources that can be simultaneously received by the terminal device and that are recently reported by the terminal device. The one-to-one correspondence may be understood as being equal or associated.

The SRS includes a plurality of spatialRelation or UL TCI fields, and each spatialRelation or UL TCI field includes one or more reference resources. Reference resources included in the plurality of spatialRelation or UL TCI fields have a one-to-one correspondence with a plurality of downlink signal resources that can be simultaneously received by the terminal device and that are recently reported by the terminal device. The one-to-one correspondence may be understood as being equal or associated.

The SRS (or a set in which the SRS is located) is associated with reporting configurations (reportConfig) corresponding to a plurality of downlink signal resources that can be simultaneously received by the terminal device and that are recently reported by the terminal device.

The SRS resource or the SRS resource set includes a multi-beam indication parameter, used to indicate the terminal device to send the SRS resource by using a plurality of transmit beams.

The SRS resource may include a plurality of spatialRelation or UL TCI fields. The plurality of spatialRelation or UL TCI fields have a correspondence with a plurality of antenna ports of the SRS resource, and are used to indicate information about a transmit beam used by each antenna port of the terminal device. A correspondence may be a one-to-one relationship, a one-to-many relationship, or a many-to-one relationship. For example, information in the spatialRelation or the UL-TCI may be included in an antenna port field, or information about the antenna port may be included in the spatialRelation or UL TCI field.

The spatialRelation or UL TCI field of the SRS resource may include a plurality of reference resources. These reference resources have a correspondence with a plurality of antenna ports of the SRS resource, and are used to indicate information about a transmit beam used by each antenna port of the terminal device. A correspondence may be a one-to-one relationship, a one-to-many relationship, or a many-to-one relationship. For example, information about the reference resource may be included in the antenna port field, or the information about the antenna port may be included in the resource.

When a plurality of beams are used for uplink data transmission, information about a plurality of uplink transmit beams also needs to be indicated. In one embodiment, DCI is used for indication. The DCI may include a plurality of SRI fields, a plurality of spatialRelation fields, or a plurality of UL TCI fields. Alternatively, the DCI may include only one indication field (for example, an SRI field), and the indication field corresponds to a plurality of SRS resources, a plurality of spatialRelations, or a plurality of UL TCIs. Each SRS resource/spatialRelation/UL TCI is associated with one or a group of DMRS ports to transmit one or more streams of data.

In the foregoing solution, an association relationship between the indication field and the plurality of SRS resources may be established by using the following method. In a method, one or more SRS resource sets are configured. Each set has one index value. The indication field is used to indicate an index of one SRS resource set, and indicates that an SRS resource in the resource set is used as an SRS resource for uplink data transmission. In another method, a plurality of SRS resource sets used for data transmission are configured. When the indication field indicates one index value, it indicates that the terminal device needs to use a resource whose index is the index value in each SRS resource set used for data transmission as an SRS resource for uplink data transmission. Herein, the index value of the SRS resource refers to a relative index of the SRS resource in an SRS resource set to which the SRS resource belongs. For example, two SRS resource sets are configured, each SRS resource set includes four SRS resources, and relative indexes in the resource set are #0, #1, #2, and #3. When the indication field indicates the index #1, it indicates that the terminal device needs to use two SRSs whose relative indexes are #1 in the two SRS resource sets as SRS resources for uplink data transmission. The SRS resource set may be an SRS resource set or an SRS resource set in another form. The foregoing method may be used to establish an association relationship between the indication field and a plurality of spatialRelations or a plurality of UL TCIs.

In the foregoing solution, the UL TCI is an uplink transmission configuration parameter, and a representation form in a standard may be a UL TCI, a UL TCI-state, a TCI-state, or the like. This is not limited in this application.

Figure 3:
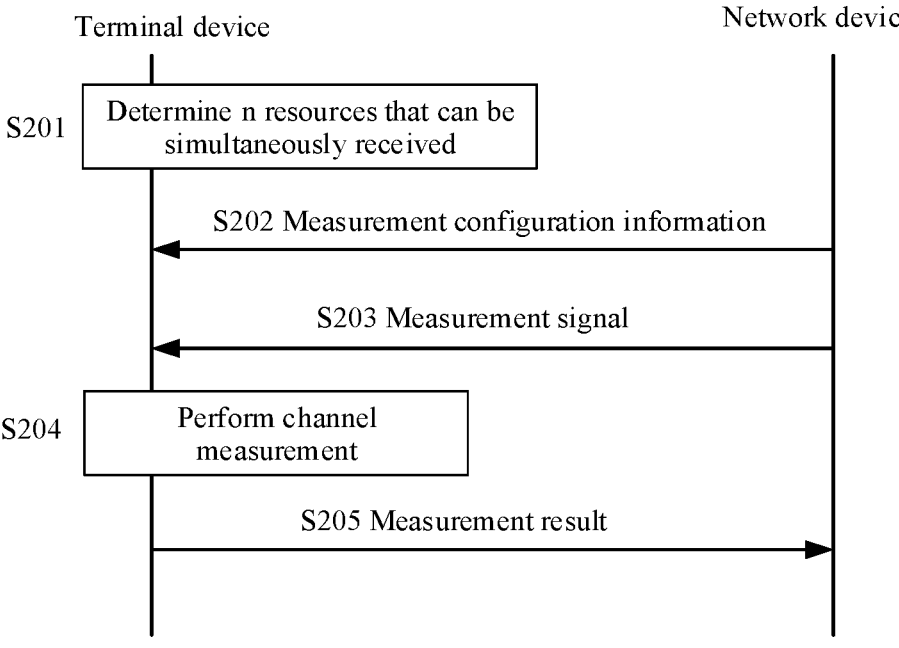
FIG. 3 is a schematic flowchart of a channel measurement method according to another embodiment of this application.

This application further discloses another beam measurement method. As shown in FIG. 3, the method includes the following operations.

S201. A terminal device determines n (n≥2) resources that can be simultaneously received.

The operation is the same as that in the foregoing embodiment, and a resource #1 and a resource #2 are still used as an example for description. Details are not described again.

S202. A network device sends measurement configuration information to the terminal device, where the measurement configuration information includes configurations of m (m≥2) resources, and n≥m.

In this embodiment, configurations of m=2 resources, namely, a resource #3 and a resource #4 are used as an example for description.

The measurement configuration information mainly includes a measurement resource configuration and a measurement reporting configuration.

The measurement resource configuration includes configurations of two resources (the resource #3 and the resource #4). Similar to 102, the resource may be an NZP CSI-RS resource, an SSB resource, a CSI-IM resource, a ZP CSI-RS resource, or any other downlink signal resource.

In another embodiment, the resource may alternatively be an uplink signal resource.

TCI-states of the resource #3 and the resource #4 are configured, so that the resource #3 and the resource #4 respectively have same TCI configurations as the resource #1 and the resource #2. For example, a reference signal resource corresponding to QCL-info of type D in the TCI-state of the resource #3 is the resource #1, and a reference signal resource corresponding to QCL-info of type D in the TCI-state of the resource #4 is the resource #2.

There may be another form for the same TCI configuration. For details, refer to the foregoing embodiment.

The measurement reporting configuration includes configuration information related to measurement result reporting, and a parameter groupBasedBeamReporting is used to indicate whether the terminal device reports two resources that can be simultaneously received by the terminal device.

This operation is similar to S102. Refer to the description of S102.

S203. The network device sends a corresponding measurement signal to the terminal device based on the measurement configuration information.

The network device sends corresponding measurement signals to the terminal device based on the configurations of the resource #3 and the resource #4. For example, the network device separately sends measurement signals corresponding to the resource #3 and the resource #4 to the terminal device by using two beams corresponding to the resource #1 and the resource #2, and may simultaneously send the measurement signals, or may sequentially send the measurement signals.

The measurement signal may be any downlink signal such as an NZP CSI-RS or an SSB.

S204. The terminal device receives the m resources by using receive beams corresponding to the n resources for measurement.

An example in which m=2 is used for description. Before performing channel measurement, the terminal device needs to determine a receive beam used to receive a measurement signal.

For example, the terminal device determines, by using configuration information, for example, one or more of TCI-state configurations of the resource #3 and the resource #4, a configuration of whether the resource #3 and the resource #4 are configured in a same resource set, a configuration of whether the resource #3 and the resource #4 are configured on a same OFDM symbol, and a groupBased-BeamReporting configuration, receive beams to be used to receive the measurement signals corresponding to the resource #3 and the resource #4, to perform measurement. In one embodiment, when some conditions are met, the terminal device may consider that the resource #3 and the resource #4 need to be jointly measured for CSI of a same channel. In this case, receive beams corresponding to the resource #1 and the resource #2 need to be used to simultaneously receive the measurement signals corresponding to the resource #3 and the resource #4, to perform measurement. For example, when the receive beams of the resource #1 and the resource #2 are different, the terminal device needs to simultaneously receive the measurement signals on the resource #3 and the resource #4 by using the two receive beams corresponding to the resource #1 and the resource #2, to perform measurement. If the resource #3 and the resource #4 are not simultaneously sent, when the measurement signals corresponding to the resource #3 and the resource #4 are separately received, the two receive beams corresponding to the resource #1 and the resource #2 also need to be used for simultaneous receiving. After the measurement signals corresponding to the resource #3 and the resource #4 are received, a set of CSI information is determined by combining the resource #3 and the resource #4. The foregoing condition may be any one or more of the following:

The resource #3 and the resource #1 have a same TCI configuration, and the resource #4 and the resource 2 have a same TCI configuration;

the resource #3 and the resource #4 are configured in a same resource set;

the resource #3 and the resource #4 are configured on a same OFDM symbol;

groupBasedBeamReporting is configured; or groupBasedBeamReporting is configured to a value, for example, enabled or disabled.

The parameter groupBasedBeamReporting is configured based on the measurement configuration information. That the resource #3 and the resource #4 are configured on a same OFDM symbol means that, based on resource mapping configurations of the resource #3 and the resource #4, time-frequency resources corresponding to the resource #3 and the resource #4 are distributed in one or several same OFDM symbols. That is, the time-frequency resources completely overlap in time domain.

If any one or more of the foregoing conditions are met, the terminal device performs joint measurement on the resource #3 and the resource #4 by using the receive beams corresponding to the resource #1 and the resource #2, that is, the terminal device simultaneously receives the resource #3 and the resource #4 by using the receive beams corresponding to the resource #1 and the resource #2, and performs measurement. In one embodiment, the terminal device simultaneously receives the measurement signals corresponding to the resource #3 and the resource #4, performs channel measurement, and determines a group of measurement results, such as an RI, a CQI, and a PMI. Herein, the joint measurement means that the resource #3 and the resource #4 are considered as different spatial streams of a same channel, and channels measured by using the two resources are combined to calculate a measurement result.

The measurement signals corresponding to the resource #3 and the resource #4 may be simultaneously sent by the network device, or may be sequentially sent. The terminal simultaneously receives, by using receive beams corresponding to the resource #3 and the resource #4, the measurement signals corresponding to the resource #3 and the resource #4, and performs measurement.

S205. The terminal device reports the measurement result to the network device.

The n resources in the foregoing embodiments are n resources that can be simultaneously received by the terminal device and that are reported by the terminal device. For example, the n resources are n recently reported resources that can be simultaneously received by the terminal device. Alternatively, the n resources may be determined in another manner, for example, a group of resources configured by the network device, or a group of resources determined by the terminal device.

Based on the technical solutions in the foregoing embodiments, beam indication for multi-beam channel measurement may be implemented, so that receive beams for performing channel measurement are conveniently determined for a plurality of beams, thereby implementing multi-beam based channel measurement. Further, multi-beam channel measurement may support multi-beam transmission, thereby improving data transmission throughput performance.

The embodiments described in this specification may be independent solutions, or may be combined based on internal logic. These solutions all fall within the protection scope of this application.

It may be understood that, in the foregoing method embodiments, the methods and operations that are implemented by the terminal may alternatively be implemented by a component (for example, a chip or a circuit) that may be used in the terminal, and the methods and the operations that are implemented by the access network device may alternatively be implemented by a component (for example, a chip or a circuit) that may be used in the access network device.

The foregoing mainly describes the solutions provided in the embodiments of this application from a perspective of interaction. It may be understood that, to implement the foregoing functions, each network element, such as a transmit end device or a receive end device, includes a corresponding hardware structure and/or software module for performing each function. A person skilled in the art may be aware that, with reference to the examples described in the embodiments disclosed in this specification, units and algorithm operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of this application.

In the embodiments of this application, functional modules of the transmit end device or the receive end device may be divided based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in the embodiments of this application, the module division is an example, and is merely a logical function division. During actual implementation, another division manner may be used. An example in which each functional module is obtained through division based on a corresponding function is used below for description.

It should be understood that examples in the embodiments of this application are merely intended to help a person skilled in the art better understand the embodiments of this application, but are not intended to limit the scope of the embodiments of this application.

It should be understood that sequence numbers of the foregoing processes do not mean execution sequences in various embodiments of this application. The execution sequences of the processes should be determined according to functions and internal logic of the processes, and should not be constructed as any limitation on the implementation processes of the embodiments of this application.

The methods provided in the embodiments of this application are described above in detail with reference to FIG. 2 and FIG. 3. Apparatuses provided in the embodiments of this application are described below in detail with reference to the accompanying drawings. It should be understood that descriptions of the apparatus embodiments correspond to the descriptions of the method embodiments. Therefore, for content that is not described in detail, refer to the foregoing method embodiments. For brevity, details are not described herein again.

Figure 4:
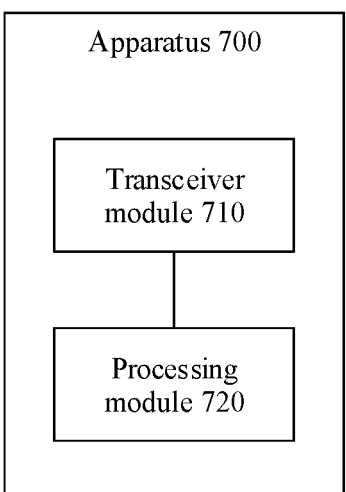
FIG. 4 is a schematic diagram of a communications apparatus according to an embodiment of this application.

FIG. 4 is a schematic block diagram of a communications apparatus 700 according to an embodiment of this application.

It should be understood that the apparatus 700 may correspond to the terminal device in the embodiments shown in FIG. 2 and FIG. 3, and may have any function of the terminal device in the method. The apparatus 700 includes a transceiver module 710 and a processing module 720. The transceiver module may include a transmit module and/or a receiving module, respectively configured to implement the receiving operation and the sending operation of the terminal device in the foregoing method embodiments. The processing module is configured to implement operations other than the receiving operation and the sending operation of the terminal device in the foregoing method embodiments. For example, the terminal device in the embodiment corresponding to FIG. 2 includes:

a receiving module, configured to receive measurement configuration information, where the measurement configuration information includes configuration information of at least one resource; and a processing module, configured to: if any one or more of the following conditions are met, determine that the at least one resource and the n resources have a same receive beam, where the n resources are n resources that can be simultaneously received, and $n \geq 2$. For the condition, refer to descriptions in the method embodiment in FIG. 2.

Further, the receiving module is further configured to simultaneously receive the at least one resource by using receive beams corresponding to the n resources for measurement.

The terminal device in the embodiment corresponding to FIG. 3 includes:

a receiving module, configured to receive measurement configuration information, where the measurement configuration information includes configurations of m resources; and a processing module, configured to: if any one or more of the following conditions are met, determine that the m resources and n resources have a same receive beam, where the n resources are n resources that can be simultaneously received, $m \geq 2$, and $n \geq m$. For the condition, refer to descriptions in the method embodiment in FIG. 3.

The receiving module is further configured to simultaneously receive the m resources by using receive beams corresponding to the n resources for measurement.

For other related operations, refer to descriptions in the method embodiments in FIG. 2 and FIG. 3. Details are not described again.

Alternatively, the foregoing apparatus may be a chip, a functional module, or the like.

Figure 5:
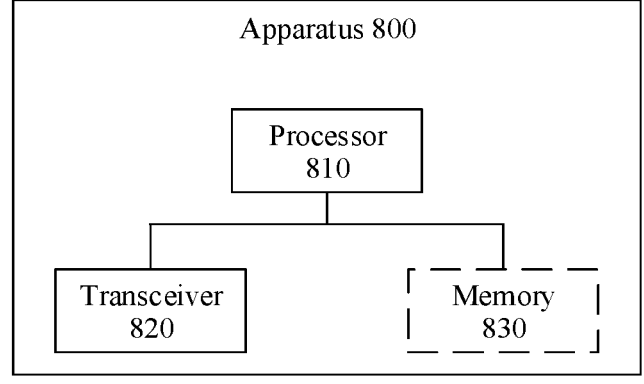
FIG. 5 is a schematic diagram of a communications apparatus according to an embodiment of this application.

FIG. 5 shows a communications apparatus 800 according to an embodiment of this application. The apparatus 800 may be the terminal device described in FIG. 2 and FIG. 3. The apparatus may include a processor 810 and a transceiver 820. The transceiver may include a transmitter and/or a receiver. In one embodiment, the apparatus may further include a memory 830. The processor 810, the transceiver 820, and the memory 830 communicate with each other by using an internal connection path. A related function implemented by the processing module 720 in FIG. 4 may be implemented by the processor 810, and a related function implemented by the transceiver module 710 may be implemented by the processor 810 by controlling the transceiver 820.

In one embodiment, the processor 810 may be a CPU, a microprocessor, an ASIC, a special-purpose processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program.

In one embodiment, the processor 810 may include one or more processors, for example, include one or more CPUs. When the processor is one CPU, the CPU may be a single-core CPU or a multi-core CPU.

The transceiver 830 is configured to send and receive data and/or a signal, and receive data and/or a signal. The transceiver may include a transmitter and a receiver. The transmitter is configured to send data and/or a signal, and the receiver is configured to receive data and/or a signal.

The memory 840 includes but is not limited to a RAM, a ROM, an EPROM, and a compact disc read-only memory (CD-ROM). The memory 840 is configured to store a related instruction and data.

The memory 840 is configured to store program code and data of the terminal, and may be a separate device or integrated into the processor 810.

In one embodiment, the processor 810 is configured to control the transceiver to perform information transmission with the terminal. For details, refer to the descriptions in the foregoing method embodiments. Details are not described herein again.

In one embodiment, the apparatus 800 may further include an output device and an input device. The output device communicates with the processor 810, and may display information in a plurality of manners. For example, the output device may be a liquid crystal display (LCD), a light emitting diode (LED) display device, a cathode ray tube (CRT) display device, a projector, or the like. When communicating with the processor 810, the input device may receive an input from a user in a plurality of manners. For example, the input device may be a mouse, a keyboard, a touchscreen device, or a sensor device.

It can be understood that FIG. 5 shows only a simplified design of the apparatus. During actual application, the apparatus may further include other components, including but not limited to any quantity of transceivers, processors, controllers, memories, and the like, and all terminals that can implement this application shall fall within the protection scope of this application.

In one embodiment, the apparatus 800 may be a chip, for example, may be a communications chip that may be used in the terminal, and configured to implement a related function of the processor 810 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. In one embodiment, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

In addition, the schematic diagrams of the apparatuses in FIG. 4 and FIG. 5 are also applicable to the network device in the foregoing method embodiments. The transceiver module or the transceiver is configured to implement the receiving operation and the sending operation in the method embodiments. Operations other than the receiving operation and the sending operation are implemented by the processing module or the processor. For details, refer to the method embodiments. Details are not described again.

Figure 6:
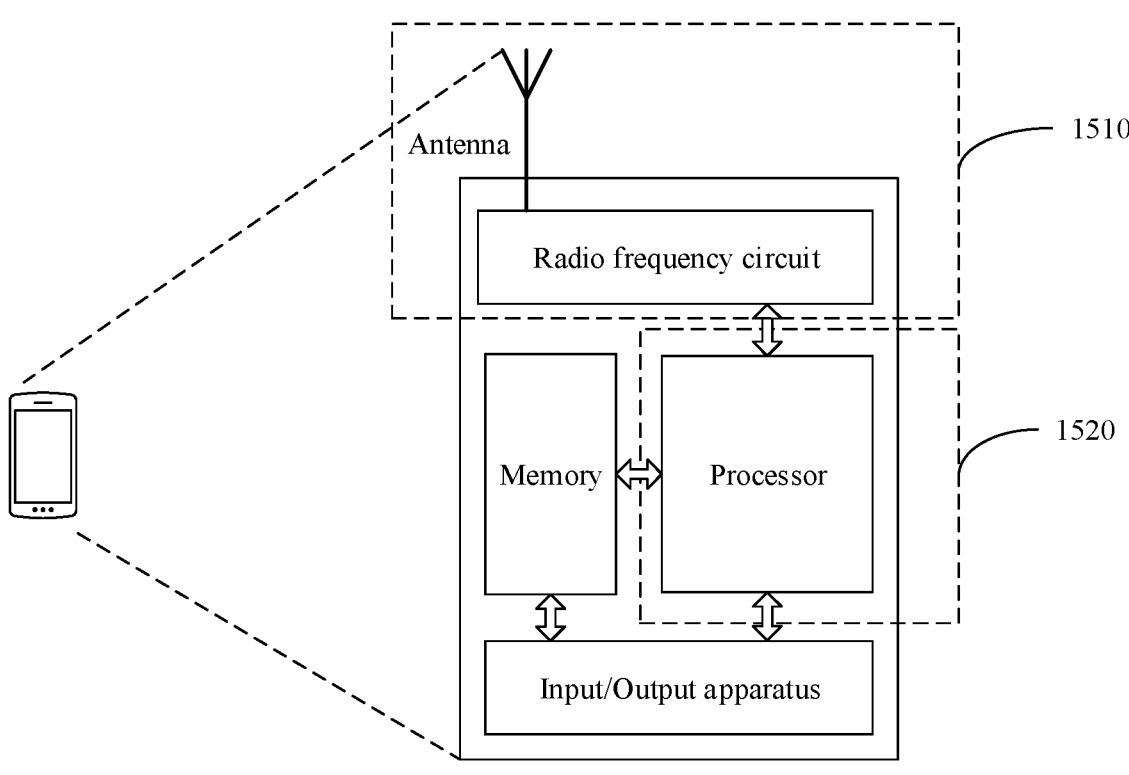
FIG. 6 is a schematic diagram of a communications apparatus according to another embodiment of this application.

FIG. 6 is a simplified schematic diagram of a structure of a terminal device. For ease of understanding and illustration, an example in which the terminal is a mobile phone is used in FIG. 6. As shown in FIG. 6, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminals may not have the input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 6, the terminal includes a transceiver unit 1510 and a processing unit 1520. The transceiver unit may also be referred to as a transceiver, a transceiver machine, a transceiver apparatus, or the like. The processing unit may also be referred to as a processor, a processing board, a processing module, a processing apparatus, or the like. In one embodiment, a component that is in the transceiver unit 1510 and that is configured to implement a receiving function may be considered as a receiving unit, and a component that is in the transceiver unit 1510 and that is configured to implement a sending function may be considered as a sending unit. That is, the transceiver unit 1510 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1510 is configured to perform a sending operation and a receiving operation of the terminal device in the foregoing method embodiments, and the processing unit 1520 is configured to perform operations other than the receiving operation and the sending operation of the terminal device in the foregoing method embodiments.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 7:
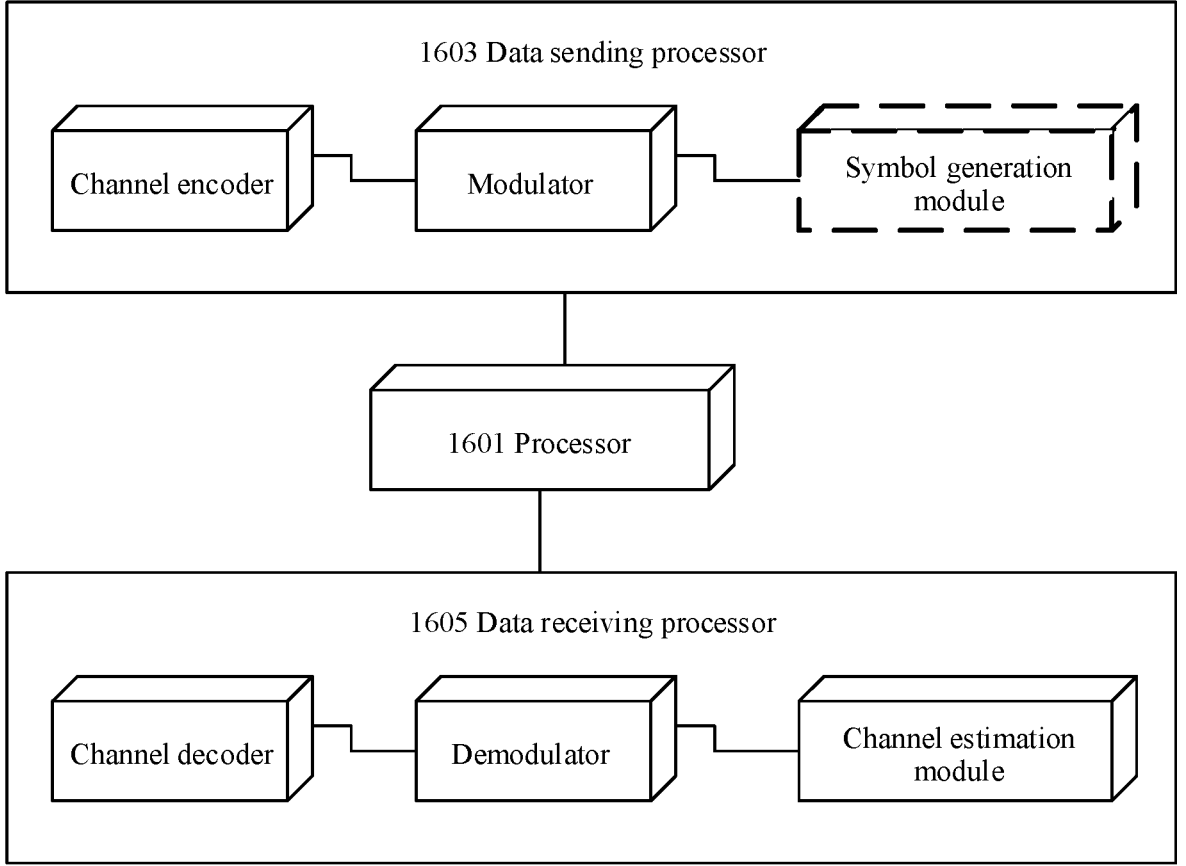
FIG. 7 is a schematic diagram of a communications apparatus according to another embodiment of this application.

In one embodiment, when the apparatus is a terminal device, further refer to the device shown in FIG. 7. In an example, the device may implement a function similar to that of the processor 1510 in FIG. 6. In FIG. 7, the device includes a processor 1601, a data sending processor 1603, and a data receiving processor 1605. The processing module in the foregoing embodiment may be the processor 1601 in FIG. 7, and completes a corresponding function. The transceiver unit or the transceiver module in the foregoing embodiment may be the data receiving processor 1605 or the data sending processor 1603 in FIG. 7. Although a channel encoder and a channel decoder are shown in FIG. 7, it may be understood that these modules do not constitute a limitative description of this embodiment, and are merely illustrative.

Figure 8:
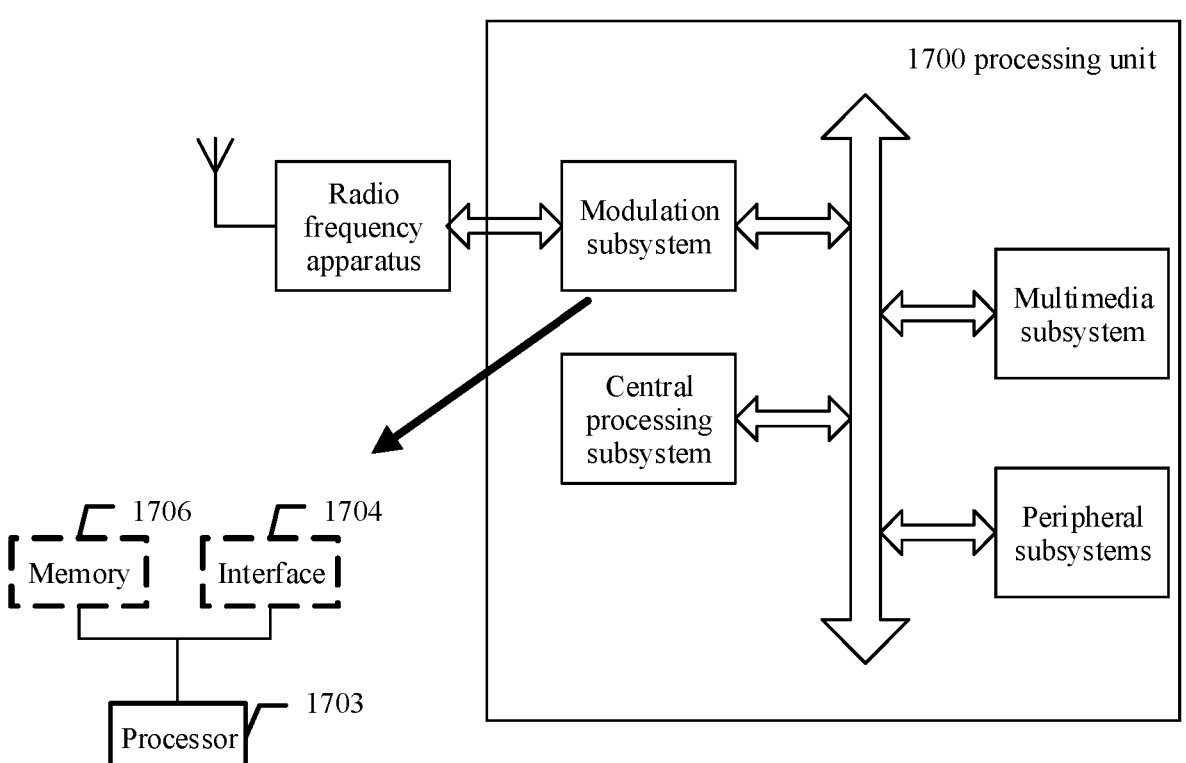
FIG. 8 is a schematic diagram of a communications apparatus according to another embodiment of this application.

FIG. 8 shows another form of a terminal device according to this embodiment. A processing apparatus 1700 includes modules such as a modulation subsystem, a central processing subsystem, and a peripheral subsystem. The communications device in this embodiment may be used as the modulation subsystem in the processing apparatus. In one embodiment, the modulation subsystem may include a processor 1703 and an interface 1704. The processor 1703 completes a function of a processing module 720 or a processing module 1120, and the interface 1704 completes a function of a transceiver module 710 or a transceiver module 1110. As another variation, the modulation subsystem includes a memory 1706, a processor 1703, and a program that is stored in the memory and that can be run on the processor. The processor executes the program to implement the methods in the foregoing method embodiments. It should be noted that the memory 1706 may be non-volatile, or may be volatile. The memory 1706 may be located in the modulation subsystem, or may be located in the processing apparatus 1700, as long as the memory 1706 can be connected to the processor 1703.

Figure 9:
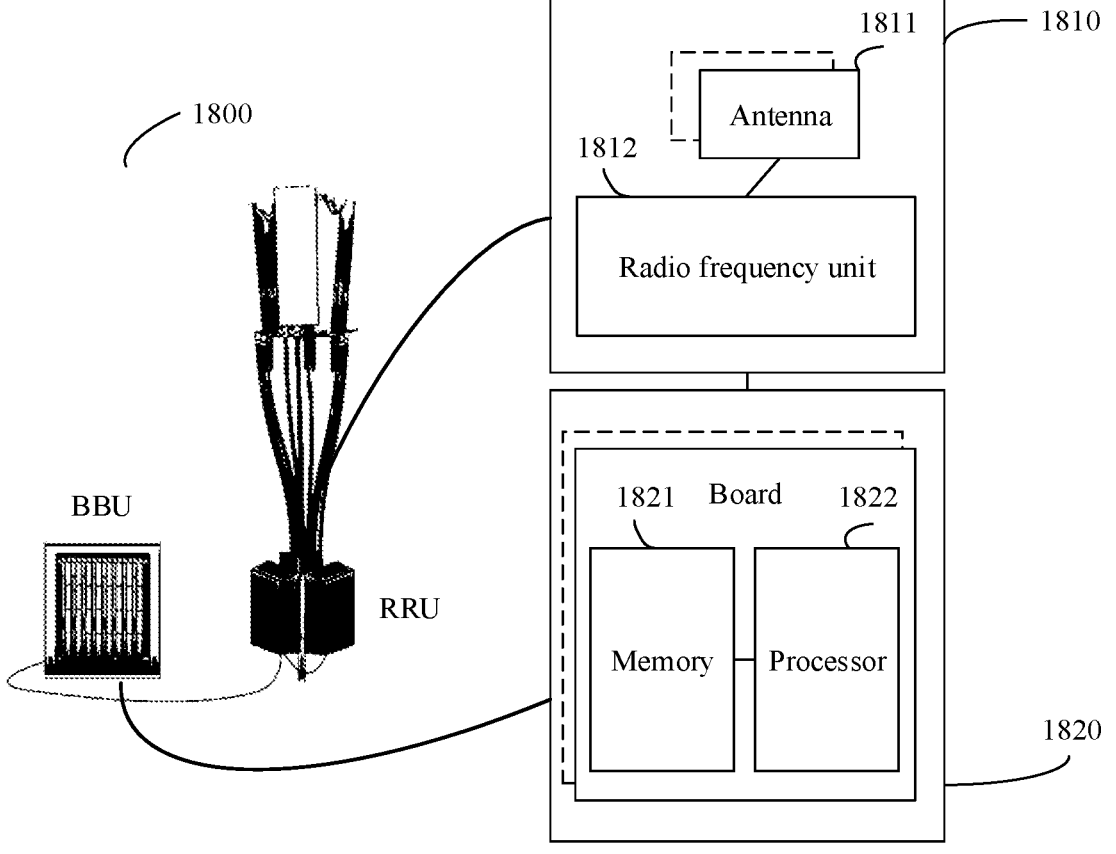
FIG. 9 is a schematic diagram of a communications apparatus according to another embodiment of this application.

In this application, the network device may be shown in FIG. 9. An apparatus 1800 includes one or more radio frequency units such as a remote radio unit (RRU) 1810 and one or more baseband units (BBUs) (which may also be referred to as digital units, DUs) 1820. The RRU 1810 may be referred to as a transceiver module, and corresponds to the receiving module and the sending module. In one embodiment, the transceiver module may also be referred to as a transceiver machine, a transceiver circuit, a transceiver, or the like, and may include at least one antenna 1811 and a radio frequency unit 1812. The RRU 1810 is mainly configured to: send and receive a radio frequency signal, and perform conversion between the radio frequency signal and a baseband signal. For example, the RRU 1810 is configured to send indication information to a terminal. The BBU 1810 is mainly configured to: perform baseband processing, control a base station, and so on. The RRU 1810 and the BBU 1820 may be physically disposed together, or may be physically separated, that is, in a distributed base station.

The BBU 1820 is a control center of the base station, and may also be referred to as a processing module. The BBU 1820 may correspond to the processing module 920 in FIG.

9, and is mainly configured to implement a baseband processing function such as channel coding, multiplexing, modulation, or spreading. For example, the BBU (the processing module) may be configured to control the base station to perform an operation procedure related to the access network device in the foregoing method embodiments, for example, generate the foregoing indication information.

In an example, the BBU 1820 may include one or more boards. A plurality of boards may jointly support a radio access network (for example, an LTE network) of a single access standard, or may separately support radio access networks (for example, an LTE network, a 5G network, or another network) of different access standards. The BBU 1820 further includes a memory 1821 and a processor 1822. The memory 1821 is configured to store instructions and data. The processor 1822 is configured to control the base station to perform an action, for example, configured to control the base station to perform an operation procedure related to the access network device in the foregoing method embodiments. The memory 1821 and the processor 1822 may serve one or more boards. In other words, a memory and a processor may be disposed on each board. Alternatively, a plurality of boards may share a same memory and a same processor. In addition, a circuit may further be disposed on each board.

In addition, the access network device is not limited to the foregoing forms, and may alternatively be in another form. For example, the network device includes a BBU and an adaptive radio unit (ARU), or includes a BBU and an active antenna unit (AAU), or may be customer premises equipment (CPE), or may be in another form. This is not limited in this application.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid state disk (SSD)), or the like.

It should be understood that, the processor may be an integrated circuit chip, and has a signal processing capability. In an implementation process, operations in the foregoing method embodiments may be implemented by using a hardware integrated logical circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and logical block diagrams that are disclosed in the embodiments of this application. The general-purpose processor may be a microprocessor, or the processor may be any conventional processor, or the like. The operations of the methods disclosed with reference to the embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The non-volatile memory may be a ROM, a PROM, an EPROM, an EEPROM, or a flash memory. The volatile memory may be a RAM and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "I" usually represents an "or" relationship between the associated objects. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be constructed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. The components may communicate through a local and/or remote process based on, for example, a signal having one or more data packets (for example, data from two components interacting with another component between local systems, distributed systems, and/or across a network such as the internet interacting with other systems by using a signal).

It should be further understood that "first", "second", and various numerical symbols in this specification are merely used for distinguishing for ease of description, and are not intended to limit the scope of the embodiments of this application.

It should be understood that, the term "and/or" in this specification describes only an association relationship between associated objects, and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for determining a receive parameter used for channel measurement comprising:
   receiving measurement configuration information, wherein the measurement configuration information comprises configuration information of at least one resource;
   determining whether following conditions are met; and
   after determining that the following conditions are met, determining that the at least one resource and n resources have a same receive beam, wherein the n resources are n resources that are simultaneously receivable, and n≥2;
   wherein the conditions comprise:
   the at least one resource has a same transmission configuration index (TCI) configuration as one of the n resources, and a parameter groupBasedBeamReporting is further configured in the measurement configuration information; and the at least one resource has a same TCI configuration as one of the n resources, and a value of a configured parameter groupBasedBeamReporting is enabled.

2. The method according to claim 1, wherein the n resources are n recently reported resources that are simultaneously receivable.

3. The method according to claim 1, wherein the at least one resource comprises at least two resources.

4. The method according to claim 3, wherein the conditions further comprise:
   configurations of the at least two resources are in a same resource set of the measurement configuration information; or
   configurations of the at least two resources are on a same orthogonal frequency division multiplexing (OFDM) symbol.

5. A method for determining a receive parameter used for channel measurement comprising:
   receiving measurement configuration information, wherein the measurement configuration information comprises configuration information of m resources;
   determining whether two or more of following conditions are met; and
   after determining that two or more of the following conditions are met, determining that the m resources and n resources have a same receive beam, wherein the n resources are n resources that are simultaneously receivable, m≥2, and n≥m;
   wherein the conditions comprise:
   the m resources and m resources in the n resources respectively have same transmission configuration index (TCI) configurations, and a value of a parameter groupBasedBeamReporting in the measurement configuration information is enabled;
   configurations of the m resources are in a same resource set of the measurement configuration information; and
   configurations of the m resources are on a same orthogonal frequency division multiplexing (OFDM) symbol.

6. The method according to claim 5, wherein the n resources are n recently reported resources that are simultaneously receivable.

7. A communications apparatus comprising:
   a receiver configured to receive measurement configuration information, wherein the measurement configuration information comprises configuration information of at least one resource; and
   a processor configured to:
   determine whether following conditions are met, and
   after a determination that the following conditions are met, determine that the at least one resource and n resources have a same receive beam, wherein the n resources are n resources that are simultaneously receivable, and n≥2;
   wherein the conditions comprise:
   the at least one resource has a same transmission configuration index (TCI) configuration as one of the n resources, and a parameter groupBasedBeamReporting is further configured in the measurement configuration information; and
   the at least one resource has a same TCI configuration as one of the n resources, and a value of a configured parameter groupBasedBeamReporting is enabled.

8. The communications apparatus according to claim 7, wherein the receiver is further configured to simultaneously receive the at least one resource by using receive beams corresponding to the n resources for measurement.

9. The communications apparatus according to claim 7, wherein the at least one resource comprises at least two resources.

10. The communications apparatus according to claim 9, wherein the conditions further comprise:

configurations of the at least two resources are in a same resource set of the measurement configuration information; or configurations of the at least two resources are on a same orthogonal frequency division multiplexing (OFDM) symbol.

11. A communications apparatus comprising:

a receiver configured to receive measurement configuration information, wherein the measurement configuration information comprises configuration information of m resources; and a processor configured to:

determine whether two or more of following conditions are met, and after a determination that two or more of the following conditions are met, determine that the m resources and n resources have a same receive beam, wherein the n resources are n resources that are simultaneously receivable, $m \geq 2$, and $n \geq m$;

wherein the conditions comprise:

the m resources and m resources in the n resources respectively have same transmission configuration index (TCI) configurations, and a value of a parameter groupBasedBeamReporting in the measurement configuration information is enabled;

configurations of the m resources are in a same resource set of the measurement configuration information; and configurations of the m resources are on a same orthogonal frequency division multiplexing (OFDM) symbol.

12. The communications apparatus according to claim 11, wherein the receiver is further configured to simultaneously receive the m resources by using receive beams corresponding to the n resources for measurement.

\* \* \* \* \*